V. M. CHAFEE.
Plow.
No. 26,833.          Patented Jan. 17, 1860.
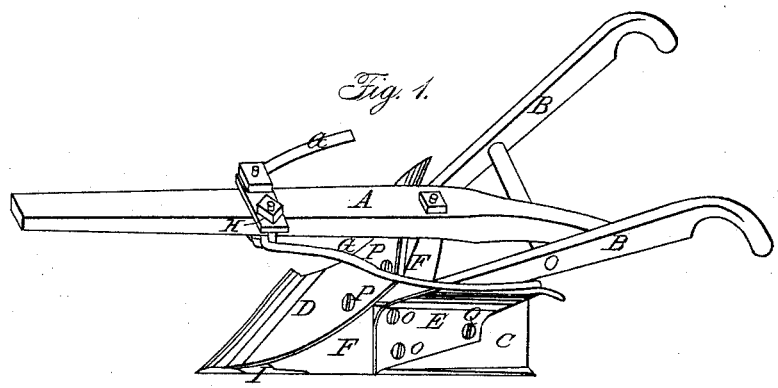
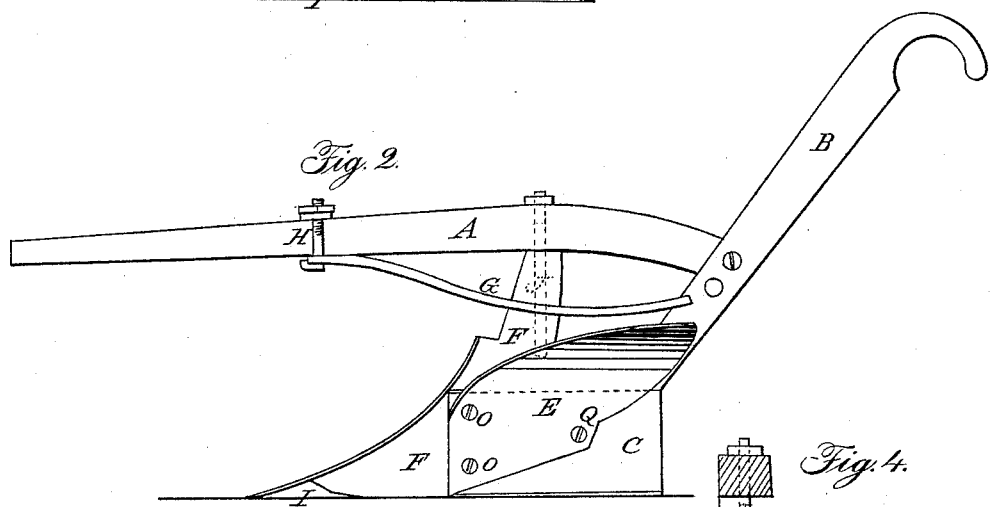
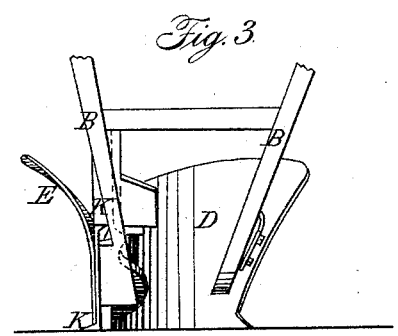
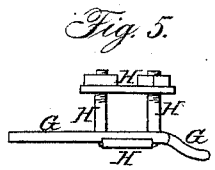
Witnesses:
Jos Carter
C. DeWM Smith
Inventor:
Vosco M Chafee

UNITED STATES PATENT OFFICE.

VOSCO M. CHAFEE, OF XENIA, ILLINOIS.

IMPROVEMENT IN PLOWS.

Specification forming part of Letters Patent No. 26,833, dated January 17, 1860.

*To all whom it may concern:*

Be it known that I, VOSCO M. CHAFEE, of Xenia, in the county of Clay and State of Illinois, have invented certain new and useful Improvements in Plows; and I do hereby declare the following is a full and exact description of the same, reference being had to the accompanying drawings, and to the letters of reference marked thereon.

In said drawings, Figure 1 is a perspective view, looking to the right. Fig. 2 is a side view, looking to the land side. Fig. 3 is a rear elevation. Fig. 4 is a rear view of the standard. Fig. 5 is a detached view of the weed-fenders.

To enable others skilled in the art to make and use my invention, I will proceed to describe its construction and operation.

A is the plow-beam; B B, the handles. C is the reversible double-flange-plate landside. D is the mold-board and share. E is the turning-plate; F, the standard; G and G', the weed-fenders; H, the stirrup to secure the weed-fenders to the beam. I is a V-shaped notch that underlaps the point of standard F; O O, bolts to secure the landside to the standard; P P, bolts to secure the mold-board to the standard; Q, bolt to secure the landside to the handle. J is the main rod that secures the standard to the beam, as shown in dotted lines in Figs. 2 and 4. K K is the rear end of the flanged landside, as shown in Fig. 3. R R are the ears or lugs on the standard, as shown in Fig. 4. L is the shoulder on the standard, as shown in Fig. 4. F is a peculiar-shaped standard, curved and beveled to suit the large mold-board D, with ears or lugs R R of such form as to make a receptacle on its rear edge for the double-flanged landside C, as shown in Fig. 4.

The mold-board and share is formed of a solid steel plate and bent to the proper shape, and a piece of iron or steel welded on the under side to thicken and stiffen it and form a peculiar V-shaped notch, so as to underlap the point of standard F, thereby clamping the point of standard and share firmly together, which will prevent grass or any foreign substance from catching or clogging, and also make it capable of resisting an endwise thrust or jolt.

The upper part of mold-board D is secured to standard F by means of the bolts P P passing through the lugs R R. The main rod I passes through the upper lug, R, and, also passing through the beam A, is firmly secured thereto by means of a nut screwed down to the beam on the upper end of the rod, as shown in dotted lines in Figs. 2 and 4.

E is a broad steel-plate landside, made high enough to prevent clods or loose dirt from falling over and clogging between the handles and beam. The reversible double-flanged landside is so constructed that the upper and lower flanges project in opposite directions, as shown at K K in Fig. 3. The object of these flanges is to form a broad wearing-surface on a light plate, and also to cut sufficiently under the bank side of the furrow to steady the plow. When the lower flange first in use becomes worn out, then by removing the bolts O O and Q the landside C can be reversed, thus bringing the unworn flange into use.

E is a small turning-plate, attached at its front and lower edge by the bolts O O and Q, and curves gently to the left at its upper and rear edges, as shown in Figs. 1, 2, and 3. The utility of this turning-plate E will at once be perceived by those plowing young corn.

By running the plow to the left side of the corn-row (which is a universal practice) the main furrow is thrown to the right, covering weeds and agitating the soil, and at the same the turning-plate E distributes the loose top soil gently to the left, thereby slightly hilling the young corn, thus rendering it clean and healthy.

In order to obviate the serious difficulty experienced when plowing in fields where the grass and weeds are tall, which are constantly choking in between the standard and handles and have to be pulled out by hand, thus causing great delay and loss of time, I have constructed the double guard or fenders G and G'. These guards or fenders are attached to the stirrup H on beam A, as shown in Figs. 1 and 2. This stirrup H can be moved on the beam A and secured wherever desired, and the ends of the guards or fenders can be elevated or depressed, as the character of the work may require.

In plowing in high grass or weeds the end G, fronting the mold-board, coming in contact with weeds or grass, "cants" them over, greatly facilitating or assisting the mold-board D in turning them under. At the same time the end G, hanging above and nearly parallel with the landside, fends off the standing weeds or grass from the landside of the plow, thus effectually preventing it from clogging or choking around the standard or handles.

Having fully described my invention, what I claim as new, and desire to secure by Letters Patent, is—

1. The double-flanged reversible-cutter landside, in combination with the peculiar-shaped standard D and bolts O O and Q, substantially as set forth.

2. The arrangement of the turning-plate E, in combination with the double-flanged reversible-cutter landside and bolts O O and Q, or their equivalents.

VOSCO M. CHAFEE.

Witnesses:
  JOS. CARTER,
  C. DE WITT SMITH.